US012165297B2

(12) United States Patent
Berthels et al.

(10) Patent No.: US 12,165,297 B2
(45) Date of Patent: Dec. 10, 2024

(54) CAMERA SYSTEM AND METHOD FOR DETERMINING A VIEWING FRUSTUM

(71) Applicant: GENERAC POWER SYSTEMS, INC., Waukesha, WI (US)

(72) Inventors: John Berthels, Sherwood (GB); Paul Brook, Leeds (GB); Marc Graham Evans, Leeds (GB); Matas Rimas Sriubiskis, Toronto (CA)

(73) Assignee: GENERAC POWER SYSTEMS, INC., Toronto (CA)

( * ) Notice: Subject to any disclaimer, the term of this patent is extended or adjusted under 35 U.S.C. 154(b) by 533 days.

(21) Appl. No.: 17/553,163

(22) Filed: Dec. 16, 2021

(65) Prior Publication Data

US 2022/0198620 A1 Jun. 23, 2022

Related U.S. Application Data

(60) Provisional application No. 63/126,677, filed on Dec. 17, 2020.

(51) Int. Cl.
*G06T 5/80* (2024.01)
*G06T 5/50* (2006.01)
*H04N 23/61* (2023.01)
*H04N 23/698* (2023.01)
*H04N 23/80* (2023.01)

(52) U.S. Cl.
CPC ............ *G06T 5/80* (2024.01); *G06T 5/50* (2013.01); *H04N 23/61* (2023.01); *H04N 23/698* (2023.01); *H04N 23/80* (2023.01)

(58) Field of Classification Search
CPC ............ G06T 2207/10028; G06T 7/70; G06T 19/006; G06T 2207/20221; G06T 3/18; G06T 17/00; G06T 7/55; G06T 5/80; G06T 5/50; H04N 23/61; H04N 23/80; H04N 23/698
See application file for complete search history.

(56) References Cited

U.S. PATENT DOCUMENTS

| | | | |
|---|---|---|---|
| 2004/0061787 A1* | 4/2004 | Liu ................... | H04N 5/2628 348/E5.042 |
| 2008/0129825 A1* | 6/2008 | DeAngelis .......... | H04N 23/661 348/E7.086 |
| 2009/0267801 A1* | 10/2009 | Kawai .............. | G08G 1/096783 348/148 |
| 2015/0304559 A1* | 10/2015 | Glasse ................ | H04N 23/90 348/38 |
| 2016/0044276 A1* | 2/2016 | Shearman .......... | A42B 3/042 348/207.1 |
| 2018/0247441 A1* | 8/2018 | Kormandel ............ | G06T 11/60 |
| 2019/0222823 A1* | 7/2019 | Clagg ................ | H04N 7/183 |
| 2019/0318543 A1* | 10/2019 | Skidmore ............ | G06T 15/20 |

* cited by examiner

*Primary Examiner* — Dung Hong

(74) *Attorney, Agent, or Firm* — Perry + Currier Inc.

(57) ABSTRACT

A novel system and method for determining a viewing frustum for a wide angle camera system employs multiple detection sub-systems to detect the presence or occurrence of events and/or objects of interest within the entire captured field of view of the system and processes the results of those detection sub-systems in accordance with a Hierarchy of Interest to select a viewing frustum for providing a de-warped view of interest to a viewer. The Hierarchy of Interest can be predefined, or selected from a set of Hierarchies of Interest and/or can be adaptive is response to feedback from a viewer.

5 Claims, 3 Drawing Sheets

CAMERA SYSTEM AND METHOD FOR DETERMINING A VIEWING FRUSTUM

FIELD OF THE INVENTION

The present invention relates to a camera system and method of determining a viewing frustum from a wide angle surveillance camera.

BACKGROUND OF THE INVENTION

Recent decreases in hardware costs, a commensurate increase in the availability of network communications (WiFi, Cellular Data, etc.) and the adoption of Smart Home technologies have led to an increase in the popularity of home security cameras.

Such cameras typically comprise an image sensor and lens, operable to capture a video image of an area about the camera, and communications systems to transmit the captured video to a remote viewer. Current popular examples of smart home security cameras include doorbell cameras, such as the Ring™ video doorbell and the Ecobee™ SmartCamera™.

To reduce costs and provide maximum functionality, some cameras, like the Ecobee SmartCamera, employ fish eye or anamorphic lenses and a large image sensor to provide coverage of wide viewing areas about the camera, approaching 180°, while eliminating the need for expensive mechanical systems to physically move the camera to achieve a similar coverage.

However, as is known, the use of fisheye or anamorphic lenses results in an undesirable distortion of the images captured by a camera and it is known to apply a "de-warp" function to digital images to correct the distortion resulting from the wide angle lens and the above-mentioned SmartCamera employs such a de-warp process.

As is known by those of skill in the art, to obtain a non-distorted image from an image captured with a wide angle lens, the de-warp process can only operate on a portion of the image captured by the lens and the size of that portion changes depending upon the location of the viewing frustum in the lens' field of view. The farther the viewpoint direction of the viewing frustum is from a perpendicular to the image sensor, the smaller the resulting area which can be properly de-warped. This restriction is a *rectilinear* dewarp, which has the desirable property of preserving right angles in the real world to right angles in the dewarped view. Such a dewarp "stretches" part of the image, and the large the viewed area of the field of view, the greater and more noticeable the stretching.

Thus, for cameras such as the above-mentioned SmartCamera, it is necessary to select a viewing frustum for a portion of the total field of view of the camera upon which to perform the de-warp function. That selected de-warp-processed portion is then provided to a viewer as the output from the camera. Ideally, the selected viewing frustum corresponds to the portion of the total captured wide angle image which will be of most interest to the viewer.

While systems for determining an appropriate viewing frustum are known, to date such systems have proven to be poor at consistently determining the viewing frustum which results in the image of more interest to a viewer. The prior art systems typically rely upon motion detection-based algorithms or a person detection-based algorithm which select a viewing frustum which is centered on a region of detected motion and which includes an image area about that center which can be acceptably de-warped.

These prior art systems suffer from numerous other disadvantages, including: "jitter", where motion occurs within two or more different areas of the camera's total field of view and the selected viewing frustum switches back and forth, rapidly, between the two or more different areas; improper selection, where an area without movement is in fact the area which is of most interest to a viewer but the prior art system instead selects an area having movement; and others.

SUMMARY OF THE INVENTION

Various examples of the present invention provide a novel camera system and method for determining a viewing frustum which obviates or mitigates at least one disadvantage of the prior art.

According to an aspect of the present invention, there is provided a wide angle camera system, comprising: a lens; an image sensor; a sensor processor; an image processor; and a communications unit, wherein the image processor examines a captured image with at least two different detector sub-systems each operable to detect the presence or occurrence of a different object or event and its location within the captured image, the image processor processing the outputs from the at least two detector sub-systems in accordance with a hierarchy of interest to select a viewing frustum for the captured image and the image processor de-warping the image corresponding to selected viewing frustum and providing the de-warped image to the communications unit for transmission to a viewer.

According to another aspect of the present invention, there is provided method for providing a de-warped image of interest from an image captured by a wide angle camera, comprising the steps of: examining the captured image with at least two detection sub-systems, each detection sub-system examining the image for the presence or occurrence of a different event or object and outputting its location within the captured image if the corresponding presence or occurrence is detected; processing each detected location in accordance with a hierarchy of interest to select a corresponding viewing frustum; processing the captured image using the selected viewing frustum to produce a de-warped image; and providing the de-warped image to a viewer.

Various examples of the present invention provide a novel system and method for determining a viewing frustum for a wide angle camera system employs multiple detection sub-systems to detect the presence or occurrence of events and/or objects of interest within the entire captured field of view of the system and processes the results of those detection sub-systems in accordance with a Hierarchy of Interest to select a viewing frustum for providing a de-warped view of interest to a viewer. The Hierarchy of Interest can be predefined, or selected from a set of Hierarchies of Interest and/or can be adaptive is response to feedback from a viewer.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
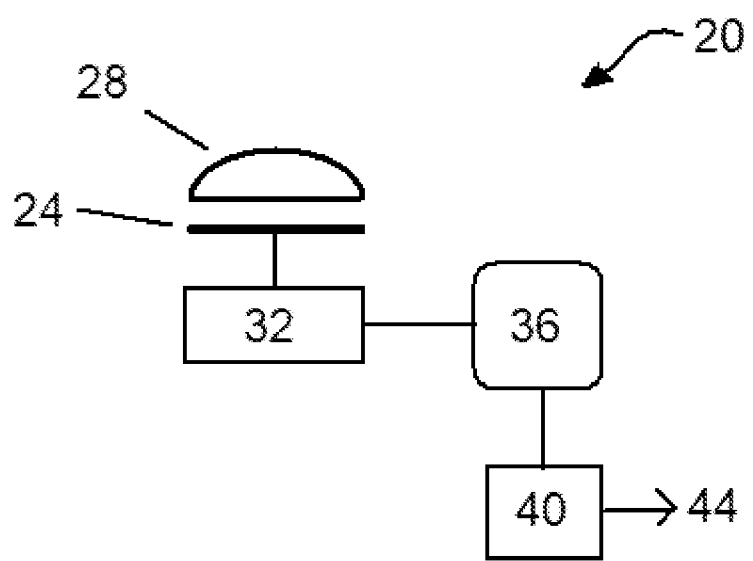
FIG. 1 shows a block diagram of the hardware components of a camera system in accordance with an aspect of the present invention.

A camera system in accordance with an aspect of the present invention is indicated generally at 20 in FIG. 1. System 20 includes an image sensor 24, such as a CCD or CMOS image sensor, and a wide angle (e.g.—anamorphic) lens 28. In a present embodiment, image sensor 24 is a five megapixel sensor and lens 28 provides approximately a 180° viewing area (180 degrees on the diagonal) about system 20.

System 20 further includes a sensor processor 32 which communicates with image sensor 24 to receive, digitize and process signals from sensor 24 to obtain digital images. As is apparent to those of skill in the art, the captured images can be still images or multiple captured images can be combined to form videos sequences at various rates, such as 30 frames per second (FPS).

The output images from sensor processor 32 are provided to image processor 36. Image processor 36 can be a microprocessor, a graphics processing unit (GPU) or any other suitable computational device capable of performing image processing operations, such as de-warp, on images provided by sensor processor 32 and capable of performing image analysis operations such as motion detection, object and/or facial recognition, etc. as described below in more detail.

In many cases, two or more of image sensor 24, sensor processor 32 and image processor 36 will be combined as a single integrated circuit package but the present invention is not limited to any particular construction or arrangement of these components.

The resulting processed images, or videos, produced by image processor 36 are provided to a communications unit 40 which then transmits 44 the processed images and/or videos to a desired destination such as a viewer or storage server, etc. Communications unit 40 can be a WiFi transceiver, a cellular data transceiver, an Ethernet transceiver or any other suitable communications subsystem as will occur to those of skill in the art.

It is also contemplated that, in another embodiment of the present invention, the output of sensor processor 32 can be forwarded directly by communications unit 40 to a remote location (i.e.—in the so called "cloud") where image processor 36 can be located. In this embodiment, image processor 36 can perform processing of images and/or videos as received from communications unit 40 or can perform subsequent processing on stored received images and videos as or when desired.

The present inventors have determined that by employing a selection of feature detection sub-systems, which are arranged in a definable hierarchy, the problems with prior art frustum determination systems, can be avoided or mitigated.

Specifically, in one aspect of the present invention, image processor 36 can employ a selection of detection sub-systems including: motion tracking detection (including speed and amplitude factorization); person detection (i.e.— person or persons versus other objects); object detection (i.e.—packages, etc.); facial recognition (i.e.—known persons); etc. and the outputs from the selection of sub-systems are combined and processed according to a defined Hierarchy of Interest ("HoI"). As will be apparent, the selection of detection sub-systems is not particularly limited and a wide variety of suitable detection sub-systems will occur to those of skill in the art such as detection systems for particular objects such as packages, or automobiles, detection systems for pets, detection system for weather conditions, etc.

In response to outputs of the detection systems, image processor 36 selects a frustum which provides a viewer with a view of the part of the total image captured by image sensor 24 which is determined to be of the most interest to the viewer. Specifically, image processor 36 will select a frustum which, when processed to de-warp the image, contains the features, objects and events which are, according to the HoI, to be of most interest to the user.

In most cases, image processor 36 will form a virtual bounding box about the features of interest and will select a frustum which, when the corresponding captured images and/or video are processed to de-warp the images, will provide a viewer with a clear image of the contents of the bounding box.

Figure 2:
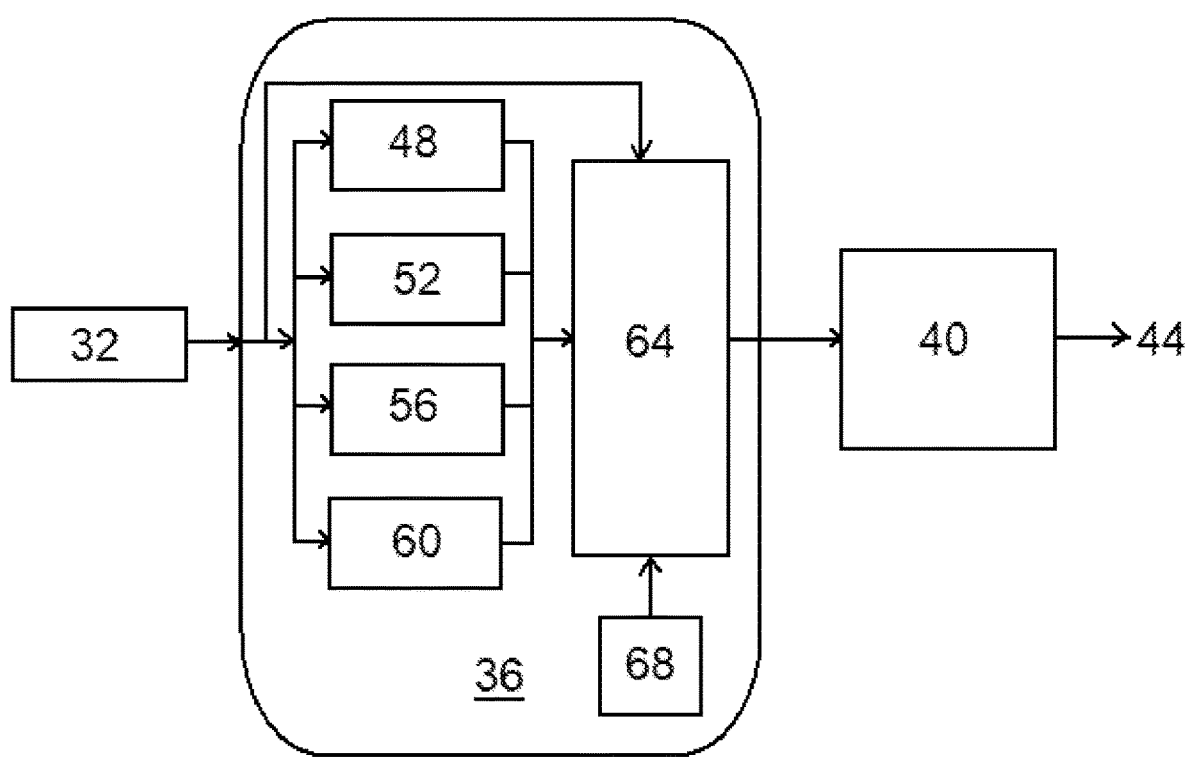
FIG. 2 shows a block diagram of the sub-systems in an image processor of the camera of FIG. 1.

As shown in FIG. 2, in one example of system 20 image processor 36 can include four detection sub-systems which can: detect a person 48; detect multiple people 52; detect an object 56; and detect motion 60. As will be apparent to those of skill in the art, these detection sub-systems can be implemented in software or hardware and suitable techniques and/or algorithms for performing the associated detection functions are known to those of skill in the art.

Each of detection sub-systems 48, 52, 56 and 60 operate on the wide angle images received from sensor processor 32 to identify regions of interest, as determined by each detection sub-system's respective detection goals. The region of interest identified by each detection sub-system is then provided to a frustum selection and de-warp sub-system 64.

Sub-system 64 applies a defined Hierarchy of Interest 68 to the regions of interest received from each detection sub-system 48, 52, 56 and 60 to determine where to locate the viewing frustum and to perform the de-warp process on the corresponding image and to output the de-warped image to communications unit 40.

As will be apparent to those of skill in the art, in many cases a detection sub-system will not detect a region of interest. For example, person detection sub-system 48 may not detect a person in the captured image and thus sub-system 48 will not output a region of interest for the captured image. Further, in some cases a detection sub-system, such as object detection sub-system 56 will output multiple regions of interest corresponding to multiple detected objects, etc.

An example of a Hierarchy of Interest 68 employed by image processor 36 can be:

(i) if a single person is detected in a captured image, the viewing frustum is selected to have the de-warped image follow the detected person while they are in the captured image, if/when the person leaves the captured image the viewing frustum will remain at the last position for a predefined duration (i.e.—10 seconds) before the HoI is followed;

(ii) if multiple people are in a captured image, the viewing frustum is selected to include all of the people in the de-warped image, if possible. If it is not possible to include all of the detected people in the de-warped image, the HoI is followed;

(iii) if a single motion event is detected, the viewing frustum is selected to have the de-warped image for the motion event for the duration of time it is in the captured image. If the motion stops, or the motion leaves the captured image, the viewing frustum will remain at the last position for a predefined duration (i.e.—5 seconds) before following other branches of the HoI;

(iv) if a single person has been detected and a second person subsequently enters the captured image, the viewing frustum should be selected to include both people in the de-warped image if possible. If it is not possible to include both people in the de-warped image the HoI is followed;

(v) if there are multiple people in the captured image and all but one person leaves, the viewing frustum should be selected to follow the remaining person while they are in the captured image, if/when the person leaves the captured image the viewing frustum will remain at the last position for a predefined duration (i.e.—10 seconds) before the HoI is followed;

(vi) if a person has been detected and is being followed by the viewing frustum and other motion within the captured image is subsequently detected, the viewing frustum should be temporarily selected to display the motion in the de-warped image for a pre-selected amount of time (i.e.—3 seconds) and then the viewing frustum should return to display the detected person in the de-warped image;

(vii) if motion has been detected and the viewing frustum has been selected to display the motion in the viewing de-warped image and, subsequently, a person is detected in the captured image, select the viewing frustum to display the person in the de-warped image; and (viii) if all detection sub-systems report no regions of interest, then have the viewing frustum remain at its last position for a pre-selected time period (i.e.—10 seconds) and then position the viewing frustum at a defined default position (i.e.—centered within the captured image.

As will be apparent, the above is merely one example of a suitable Hierarchy of Interest 68 and many others will occur to those of skill in the art. For example, if system 20 is employed as a security camera, a facial detection sub-system may be included in image processor 36 and HoI 68 may be designed to prioritize tracking of unrecognized faces within the captured image over the tracking of recognized faces.

It is also contemplated that multiple instances of HoI 68 can be defined and selected between as desired. For example, system 20 can have a first HoI 68 defined for use when system 20 is employed as a security camera when, for example, the home owner is absent from their home prioritizing motion detection, and a second HoI 68 when the homeowner is home and their children are playing within the image capture area of system 20. In the latter case, the second HoI 68 can prioritize the display of multiple people within the de-warped image over the display of objects, etc. Similarly, system 20 can have one or more HoIs 68 defined for daytime and one or more other HoIs 68 defined for nighttime.

It is further contemplated that HoI 68 can be defined adaptively, wherein feedback is received from a viewer as to the suitability of the displayed de-warped image and HoI 68 is updated accordingly.

In another aspect of the present invention it is contemplated that HoI 68 can provide for a major field of view and a minor field of view of interest. Specifically, a major viewing frustum can be selected according to HoI 68 and a corresponding de-warped image can be provided as a full screen major image output to a viewer. However, HoI 68 can also define a lower priority event for which a minor viewing frustum can be selected and a corresponding, but smaller, de-warped image can be provided as a "picture in picture" ("PIP") minor image embedded in the major image. As an example, a person may be detected and, in accordance with HoI 68, displayed to a viewer as a major output image while an object (i.e.—a package) is also detected and is provided as a minor image embedded in the major image.

A further advantage of the present invention, when implementing such a PIP system is that the minor image can be intelligently placed within the major image. Specifically, as the outputs of detection sub-systems represent regions of interest each of which is ranked by HoI 68, system 20 "knows" which parts of the de-warped images are most relevant to a viewer. For example, a major image produced as a result of a person detection sub-system will know the location of the person within the displayed image. Thus, system 20 can decide to locate a minor image to one side of the person in the major image, or above, or below, as appropriate.

As is apparent to those of skill in the art, in many cases motion detection plays an important role in determining an appropriate view frustum. However, another problem with prior art wide angle camera systems which employ motion detection is that the motion detection is performed on the captured 2D image (a 2D area). Thus, a camera system facing a street (for example a doorbell camera) and which is intended to monitor a front walkway up to the house, will experience false motion detection events due to vehicles moving along the portion of the street within the captured image of the camera. Similar issues will occur in many other circumstances, for example where motion occurs in the distant background of the captured image and the motion is detected despite the fact that the location where the motion occurred is outside the area of interest to a viewer.

Figure 3:
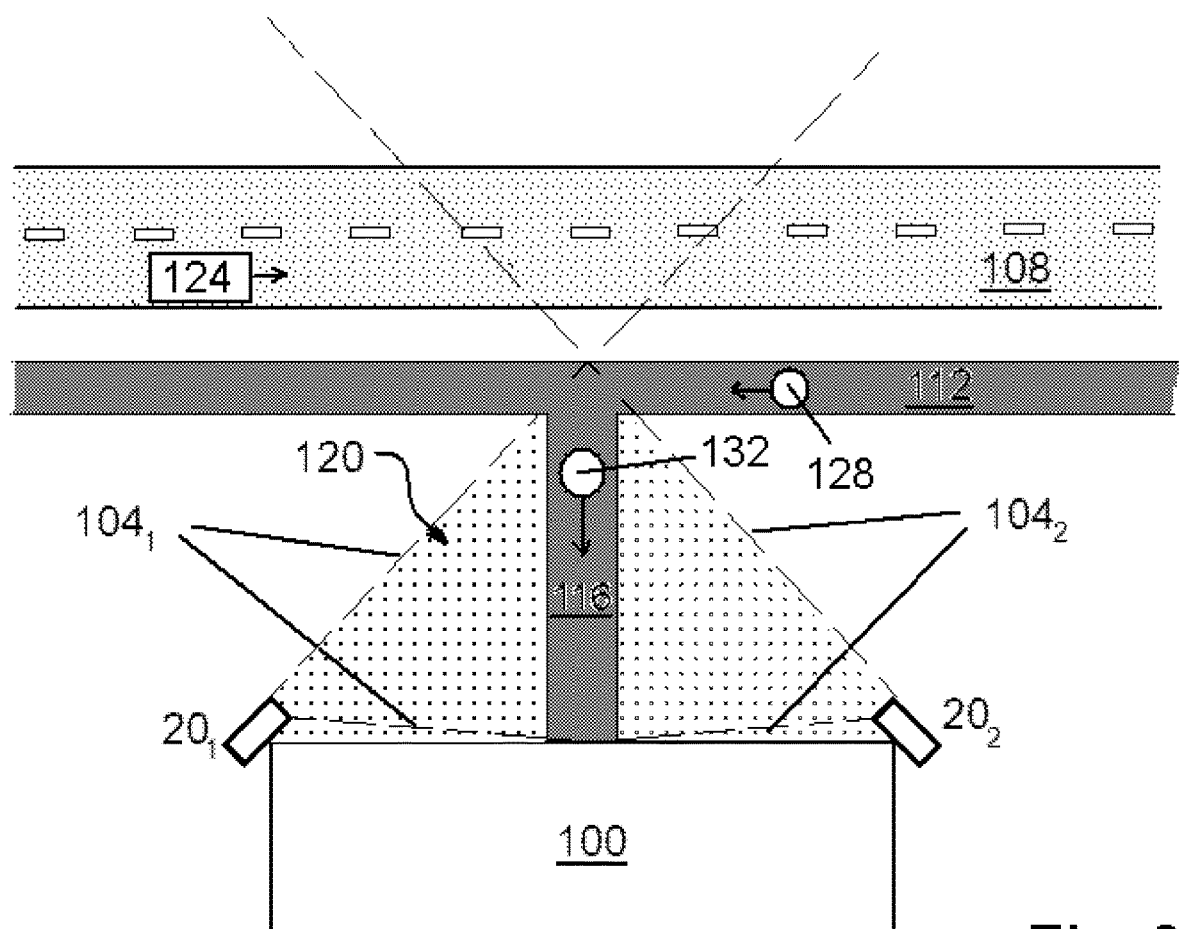
FIG. 3 shows a plan view of a street front building with two camera systems in accordance with an aspect of the present invention.

Accordingly, FIG. 3 shows another example of the present invention wherein at least two systems $20_1$ and $20_2$ are employed. Specifically, as illustrated in the example of the Figure, a building 100 has systems $20_1$ and $20_2$ installed on its exterior. As can be seen, portions of a street 108 and a sidewalk 112 are within the respective field of views of systems 20, as is a walkway 116 leading from sidewalk 112 to building 100. In this example, the owner of building 100 is interested in observing motion-based activity which occurs on walkway 116 and on the portion of sidewalk 112 directly in front of building 100.

Accordingly, systems $20_1$ and $20_2$ are arranged with a defined portion $104_1$ and $104_2$ of their respective field of views arranged to overlap. This overlap area 120 defines a 3D volume within which motion detection is to be performed.

As will be apparent, with prior art camera systems employing motion detection based upon a 2D area of interest, a car 124 moving along street 108 or a person 128 moving along other regions of sidewalk 112 would falsely be detected as motion events of interest.

In contrast, in this aspect of the present invention, systems $20_1$ and $20_2$ cooperate to only respond to motion detected within 3D volume of interest 120. Specifically, one of systems 20 (in this example system $20_1$) acts as a master unit and the other of systems 20 (in this example system $20_2$) acts as a slave unit. Each system 20 detects motion events within its respective portion 104 of its total field of view. Slave unit system $20_2$ communicates detected motion events in its portion $104_2$ to master system $20_1$ and master system $20_1$ compares the received detected motion events to those it has detected within its portion $104_1$ of its total field of view.

When a motion event received from slave system $20_2$ corresponds to a motion event detected by master system $20_1$ within its portion $104_1$, master system $20_1$ deems the event to have occurred within 3D volume of interest 120 and processes the motion detection event according to the Hierarchy of Interest 68.

In the illustrated example, car 124 moving on street 108 is within the defined portion $104_2$ of the field of view of slave system $20_2$, but is not within the defined portion $104_1$ of the field of view of master system $20_1$. Therefore master system $20_1$ does not consider the movement of car 124 as a motion event when processing the hierarchy of Interest. Similarly, person 128 is within the defined portion $104_1$ of the field of view of master system $20_1$ but is not within the defined portion $104_2$ of slave system $20_2$ and therefore master system $20_1$ does not consider the movement of person 128 as a motion event when processing the hierarchy of Interest.

In contrast, person 132 walking on walkway 116 is within both portion $104_1$ and portion $104_2$ of the respective field of views of master system $20_1$ and slave system $20_2$ and thus master system $20_1$ will detect the correspondence between the detected motion detections and will consider the movement of person 132 when processing the hierarchy of interest 68.

Portions 104 of each respective field of view can be defined in a variety of manners as will be apparent to those of skill in the art. For example, a viewer can define boundaries of the portion 104 of the viewpoint for a system 20 by drawing them on the image from system 20 as displayed on a touchscreen device, or an recognizable object or person can be positioned at the right and then left boundary of portion 104 of the viewpoint of a system 20 and the system instructed to place a corresponding left and right boundary where the person or object is located.

The present invention provides a novel system and method for determining a viewing frustum for a wide angle camera system. The camera system employs multiple detection sub-systems to detect the presence or occurrence of events and/or objects of interest within the entire captured field of view of the system and processes the results of those detection sub-systems in accordance with a Hierarchy of Interest to select a viewing frustum for providing a de-warped view of interest to a viewer. The Hierarchy of Interest can be predefined, or selected from a set of Hierarchies of Interest and/or can be adaptive is response to feedback from a viewer. In an embodiment, two or more camera systems can be employed and arranged with at least a portion of their fields of view overlapping. The two camera systems cooperate such that only a motion event detected by each camera system within a defined part of their overlapped fields of view will be considered a motion event when processing the Hierarchy of Interest.

The above-described embodiments of the invention are intended to be examples of the present invention and alterations and modifications may be effected thereto, by those of skill in the art, without departing from the scope of the invention which is defined solely by the claims appended hereto.

We claim:

1. A wide angle camera system, comprising:
   a lens;
   an image sensor;
   a sensor processor;
   an image processor; and
   a communications unit, wherein the image processor examines a captured image with at least two different detector sub-systems each operable to detect the presence or occurrence of a different object or event and its location within the captured image, the image processor processing the outputs from the at least two detector sub-systems in accordance with a hierarchy of interest to select a viewing frustum for the captured image and the image processor de-warping the image corresponding to selected viewing frustum and providing the de-warped image to the communications unit for transmission to a viewer.

2. The system according to claim 1 wherein the lens is an anamorphic lens.

3. The system according to claim 1 wherein the camera is a video camera and the de-warped image is a frame of video.

4. A method for providing a de-warped image of interest from an image captured by a wide angle camera, comprising the steps of:
   examining the captured image with at least two detection sub-systems, each detection sub-system examining the image for the presence or occurrence of a different event or object and outputting its location within the captured image if the corresponding presence or occurrence is detected;
   processing each detected location in accordance with a hierarchy of interest to select a corresponding viewing frustum;
   processing the captured image using the selected viewing frustum to produce a de-warped image; and
   providing the de-warped image to a viewer.

5. The method according to claim 4 wherein the camera is a video camera and the de-warped image is a frame of video.

* * * * *